United States Patent [19]

Saito

[11] Patent Number: 4,963,732

[45] Date of Patent: Oct. 16, 1990

[54] STRUCTURE FOR CONNECTING A ROTARY DETECTING DEVICE TO A ROTARY SHAFT

[75] Inventor: Osamu Saito, Furukawa, Japan

[73] Assignee: Alps Electric Co., Ltd., Tokyo, Japan

[21] Appl. No.: 400,176

[22] Filed: Aug. 29, 1989

[30] Foreign Application Priority Data

Dec. 28, 1988 [JP] Japan ............................. 63-168322[U]

[51] Int. Cl.⁵ .............................................. G01D 5/34
[52] U.S. Cl. .................................. 250/231.13; 33/707
[58] Field of Search ........ 250/231 SE, 237 G, 231.13; 33/707

[56] References Cited

U.S. PATENT DOCUMENTS 4,427,882  1/1984  Nakaoki et al.
4,530,159  7/1985  Ernst ....................................... 33/707
4,605,853  8/1986  Kumada et al. .............. 250/231 SE Primary Examiner—David C. Nelms
Assistant Examiner—Khaled Shami
Attorney, Agent, or Firm—Guy W. Shoup; Paul J. Winters

[57] ABSTRACT

A structure for providing relative positioning of a rotary detecting shaft of a rotary detecting device, such as a rotary encoder or a rotary switch, and a rotary shaft, is disclosed. There is an X-Y stage comprised of a plate, a first sliding plate and a second sliding plate. The rotary detecting device is fastened to the second sliding plate of the X-Y stage, and the plate is fastened to a frame to which the rotary shaft is mounted. The rotary detecting shaft is connected to the rotary shaft by a joint unit. According to the invention, aligning the rotary shaft with a rotary detecting shaft is carried out automatically by the movement of the first and second sliding plates as the rotary detecting shaft and rotary shaft are connected. Further, if exact alignment is not achieved prior to rotation of the rotary shaft, the rotational deviation of the rotary detecting shaft and rotary shaft will be eliminated by the further movement of the X-Y stage. This results in reduced rotational torque on the rotary detecting shaft and, therefore, reduced damage to bearings and other parts, and increased accuracy of detection.

4 Claims, 5 Drawing Sheets

STRUCTURE FOR CONNECTING A ROTARY DETECTING DEVICE TO A ROTARY SHAFT

BACKGROUND OF THE INVENTION

The present invention relates to a structure for providing relative positioning of a rotary shaft of a rotary detecting device such as a rotary encoder or a rotary switch, and a rotary shaft.

FIG. 6 is a cross-sectional view of an example of such a structure in the prior art. A frame 3 is positioned above a rotary shaft 2, and the rotary shaft 2 is provided with a joint unit 1, for example, a collet chuck. A pressing clamp 5 is provided for holding and clamping the rotary detecting device 4 to the frame 3. Frame 3 has a hole 6 aligned concentrically with said rotary shaft 2, and by inserting projecting portion 7 of said rotary detecting device 4 into hole 6, the rotary detecting shaft 8 can be aligned with the rotary shaft 2. The rotary detecting shaft 8 is passed through hole 6, extends downward, and is connected to said rotary shaft 2 by joint unit 1.

FIG. 7 is a cross-sectional view for illustrating further prior art. Frame 3 is provided with a hole 11 for the passage of the rotary detecting shaft 8 and screw holes 12 for fixing the rotary detecting device 4 to the frame 3. Further, frame 3 is positioned above the rotary shaft 2 such that hole 11 is above said rotary shaft 2. The rotary detecting device 4 is fastened to frame 3 by inserting the rotary detecting shaft 8 through hole 11 so that the front end portion of rotary detecting shaft 8 can be connected to said joint unit 1. Then the screws 13 are tightened into said screw holes 12.

Looking back to FIG. 6, the rotary detecting shaft 8 is aligned with rotary shaft 2 by inserting the projecting portion 7 of the rotary detecting device 4 into hole 6 which is provided on the frame 3. The diameter of hole 6 must be slightly larger than the external diameter of the projecting portion 7 for the setting operation of the rotary detecting device 4 to be efficient and smooth. This loose fitting prevents exact alignment of the rotary detecting shaft 8 and the rotary shaft 2. Therefore, a radial force due to the misalignment of both shafts 2 and 8 is imparted to the rotary detecting shaft 8 which causes damage to the bearings.

The aforementioned disadvantage can be avoided if both shafts 2 and 8 are connected by a suitable joint such as oldham's coupling joint. However, such a coupling joint must be fixed and released, which decreases workability and efficiency. Thus, such a coupling joint cannot be used in a production line.

On the other hand, alignment between rotary detecting shaft 8 and rotary detecting device 2 in the structure shown in FIG. 7 is executed by fixing the rotary detecting shaft 8 to the joint unit 1 before the screws 13 are tightened. Still though, both 2 and 8 may be misaligned after the screws 13 are tightened since aligning the fixed plate 3 with the rotary shaft 2 is difficult. The aforementioned disadvantage remains.

Again, shafts 2 and 8 can be connected by a suitable coupling joint such as oldham's coupling joint. However, such a coupling joint changes the rotational angle between the rotary shaft 2 and rotary detecting shaft 8 which decreases the accuracy of the detection.

OBJECT AND SUMMARY OF THE INVENTION

Therefore, it is an object of the present invention to provide a structure for providing relative positioning of a rotary detecting shaft of a rotary detecting device and a rotary shaft, which solves the aforementioned disadvantages.

In order to attain said object, the present invention provides an X-Y stage comprised of a plate which can be mounted to a frame to which a rotary shaft is mounted, a first sliding plate for moving back and forth along the plate along a first line, and a second sliding plate for moving back and forth on the first line sliding plate along a second line. The rotary detecting device is fixed on the second sliding plate of the X-Y stage. The rotary detecting shaft of the rotary detecting device is connected to the rotary shaft by a joint unit.

The X-Y stage, upon whose second sliding plate the rotary detecting device is fixed, moves in response to external force, in all directions in the plane perpendicular to the rotary shaft. When the rotary detecting shaft of the rotary detecting device is connected to the rotary shaft through the joint unit, the shafts are automatically aligned by the sliding of the sliding plates.

Further, if the rotary detecting shaft is not quite precisely aligned with the rotary shaft before the rotary shaft begins rotating said first sliding plate and said second sliding plate will slide in response to the rotational deviation of the rotary detecting shaft and the rotary shaft so that the rotary detecting device will automatically come into alignment with the rotary shaft.

Therefore, bending stress to the rotary detecting shaft is avoided and damage to the bearings and other parts is prevented. Further, the accuracy of the detection is increased.

BRIEF DESCRIPTION OF THE DRAWINGS

Throughout the drawings, like reference numerals and symbols are used for designating like or equivalent parts or portions, for simplicity of illustration and explanation.

DETAILED DESCRIPTION OF THE PREFERRED EMBODIMENTS

The first embodiment of the present invention will be described in detail with reference to FIGS. 1, 2 and 5.

Figure 1:
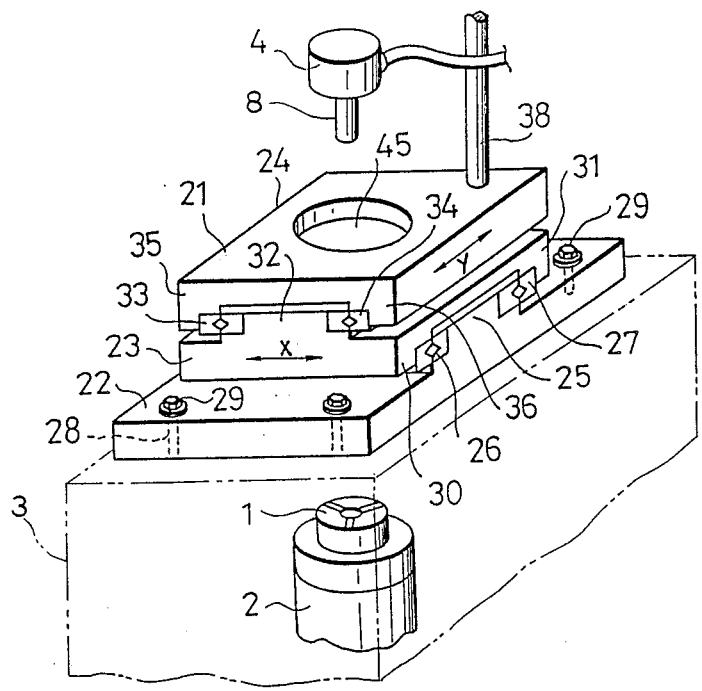
FIG. 1 is a perspective view of the first embodiment of the structure for providing relative positioning of a rotary detecting shaft of a rotary detecting device and a rotary shaft.
Figure 2:
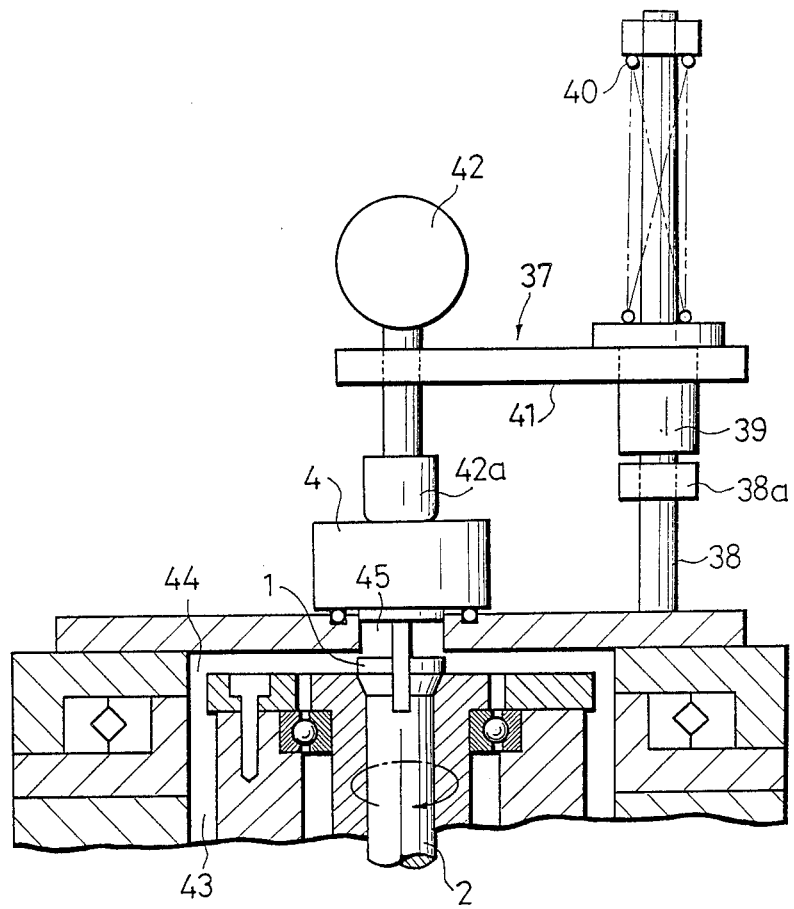
FIG. 2 is a cross-sectional view of the first embodiment of said structure.

In FIG. 1, X-Y stage 21 is comprised of a plate 22, a first sliding plate 23, and a second sliding plate 24.

Rail 25 is the protruding center portion of the stationary plate 22. Bearing units 26 and 27 are mounted at the left and right side surfaces of rail 25. Plate 22 is fixed to the frame 3 by screwing the four screws 29 through the four holes 28 provided at the four-corner portions of plate 22.

First sliding plate 23 is provided with rails 30 and 31 which extend in parallel at both ends of said sliding plate 23. Rail 32 extends perpendicular to said rails 30 and 31 and protrudes from the top center portion of sliding plate 23. Bearing units 33 and 34 are mounted to both the left and right sides of said rail 32. First sliding plate 23 is made integrally with plate 22 by inserting rails 30 and 31 into the outer race of bearing units 26 and 27 of plate 22. This allows the first sliding plate 23 to move back and forth along line X, along rail 25 of plate 22.

Rails 35 and 36 extend in parallel at both ends of the second sliding plate 24. Second sliding plate 24 is made integrally with the first sliding plate 23 by inserting rails 35 and 36 into the outer race of the bearing units 33 and 34 of the first sliding plate 23. This allows second sliding plate 24 to move back and forth along line Y, along the rail 32 which is the protruding top surface of the first sliding plate 23.

Clamp unit 37 of the rotary detecting device 4 is fixed on the second sliding plate 24. The clamp unit 37, as shown in FIG. 2, is comprised of a vertical column 38, a sliding member 39 provided slideably on column 38, a spring member 40 biasing sliding member 39 downward, an arm 41 extending from sliding member 39, and a dial gauge 42 mounted to the front end portion of arm 42.

Figure 5:
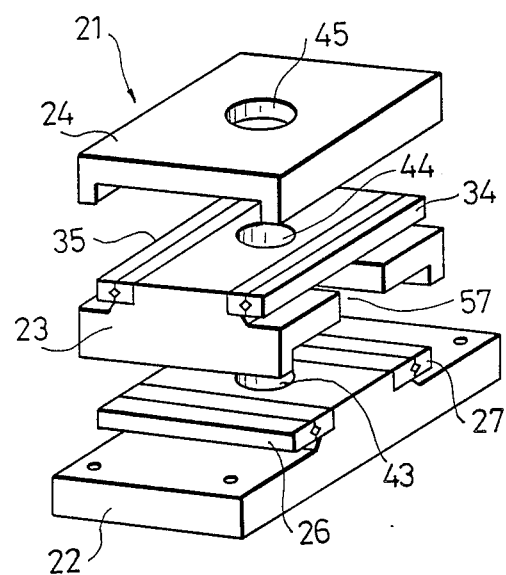
FIG. 5 is a fragmentary perspective view for showing the structure of an X-Y stage.
Figure 6:
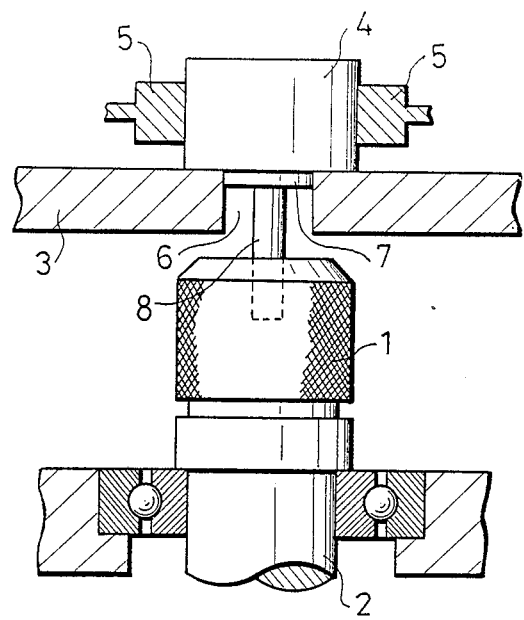
FIG. 6 is a cross-sectional view of prior art.
Figure 7:
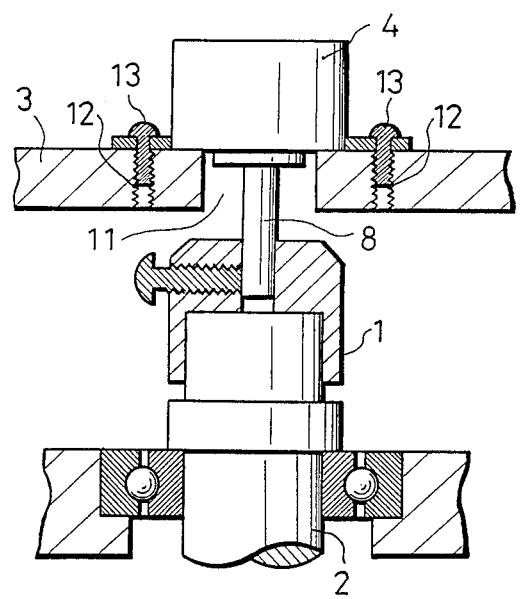
FIG. 7 is a cross-sectional view of prior art.

Holes 43, 44 and 45 are provided at the central portions respectively of plate 22, first sliding plate 23, and second sliding plate 24 as shown in FIG. 5. These holes are constructed so that the rotary detecting shaft 8 of the rotary detecting device 4 can always be passed through from the top surface of the second sliding plate 24 to the bottom surface of plate 22 regardless of the position of the first sliding plate 23 and the second sliding plate 24 with respect to plate 22. Plate 22 is fastened on frame 3 so that the hole 43 is aligned with the rotary shaft 2 as in FIG. 2.

The elements of the structure now being described, discussion turns to the use of the structure in its first embodiment.

To begin, the first sliding plate 23 and second sliding plate 24 positioned such that the holes 43, 44 and 45 are aligned concentrically. At the same time, the dial gauge 42 is raised against the resilient force of the spring member 40.

The rotary detecting device 4 is placed on the second sliding plate 24 by placing the projecting portion 7 of the rotary detecting device 4 into the hole 45. The dial gauge 42 is dropped down and the rotary detecting device 4 is clamped by the clamper 42a mounted at its front end portion. The pressure exerted by 42 is measured by the dial gauge 42 and can be adjusted by moving knob 38a (which is coupled to the column 38) up or down.

Once the first sliding plate 23 and second sliding plate 24 are initially set so that the holes 43, 44 and 45 are aligned concentrically with the rotary shaft 2, the front end portion of the rotary detecting shaft 8 is inserted into the joint unit 1. As the joint unit 1 is fastened to the rotary detecting shaft 8, shafts 2 and 8 become concentrically aligned as the first sliding plate 23 and second sliding plate 24 move.

The set up is now complete so that the rotary detecting device 4 can detect the rotary movement of the rotary shaft 2 with normal rotation or reverse rotation.

After finishing the detection, the rotary detecting device 4 can be taken out by releasing the joint unit 1, and lifting the dial gauge 42 against the resilient force of the spring member 40.

Inasmuch as the rotary detecting device 4 is mounted on the X-Y stage 21 and the rotary detecting shaft 8 of rotary detecting device 4 and the rotary shaft 2 are connected by the joint unit 1, the alignment of shafts 2 and 8 occurs so that there is no bending stress imparted to the rotary detecting shaft 8. Accordingly, when the rotary shaft 2 is driven to rotate, there is no damage to the bearings and other parts.

Further, even if the axis of the rotary shaft 2 is not exactly aligned with the rotary detecting shaft 8 before the beginning of the rotary movement, or there is not alignment between the rotary shaft 2 and the joint unit 1, the first sliding plate 23 and second sliding plate 24 slide in response to the rotational deviation of the rotary detecting shaft 8 and rotary shaft 2, bringing the rotary shaft 2 and the rotary detecting shaft 8 into alignment. Thus, no radial force is imparted to rotary detecting shaft 8 and damage to the bearings and other parts of rotary detecting shaft 8 is again prevented.

Additionally, since there is no need to use a coupling joint such as oldham's coupling joint, workability is not decreased.

The second embodiment of the present invention will be described in detail with reference to FIGS. 3, 4, and 5.

Figure 3:
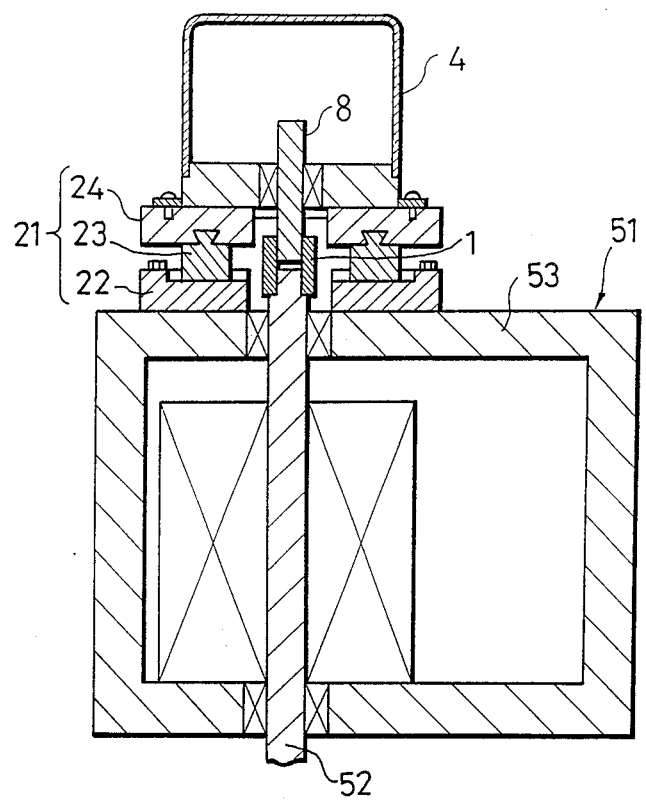
FIG. 3 is a cross-sectional view of the second embodiment of said structure.

FIG. 3 is a cross-sectional view for showing an example of a rotary detecting device fixed on the fixed external coverplate 53 of the motor 51 which has output shaft 52.

Figure 4:
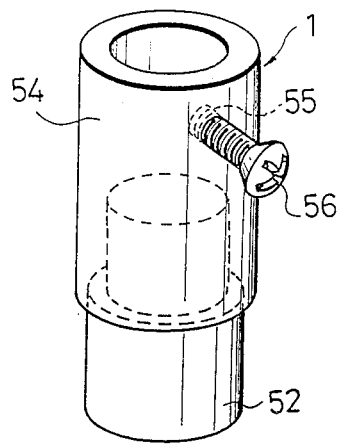
FIG. 4 is a perspective view for showing the structure of the joint unit in the second embodiment.

Joint unit 1 is comprised of a cylindrical body 54 fixed to the output shaft 52 of the motor 51 as shown in FIG. 4. Joint unit 1 is provided with a screw hole 55 and tightening screw 56. The cylindrical body 54 has an inside diameter such that it can be coupled with the rotary detecting shaft 8 by tightening the tightening screw 56.

X-Y stage 21 is comprised of, as explained in the first embodiment, plate 22, first sliding plate 23 for moving back and forth along a first line and second sliding plate 24 for moving back and forth along a second line at an angle to the first line. As shown in FIG. 5, an operating hole 57, which connects with the bottom of hole 44, is provided at the side surface of the first sliding plate 23, as means to access joint unit 1 from the exterior. Other parts are structured as in the first embodiment.

Next, the projecting portion 7 of the rotary detecting device 4 is inserted into the hole 45 provided at the second sliding plate 24 and then the rotary detecting device 4 is fixed by the clamping unit 37. At the same time, the rotary detecting shaft 8 is inserted into the holes 43, 44 and 45 from the top side direction of X-Y stage 21 and its front end portion is inserted into the cylindrical body 54 of the joint unit 1. Then the tightening screw 56 is tightened by inserting a suitable tool from the joint operating hole 57 so that the rotary detecting shaft 8 is connected to the output shaft 52 of motor 51.

As with the first embodiment, no radial force is imparted to the rotary detecting shaft 8, and the same advantages follow.

The present invention provides a means for the automatic alignment of the rotary shaft with a rotary detecting shaft wherein the deviation of the axis of the rotary detecting shaft from the center axis of the rotary shaft is eliminated by the movement of the X-Y stage. The resulting decrease in rotational torque on the rotary detecting shaft is the basis for both extended duration of the detecting device and improved detecting accuracy.

Further, since the joint unit is not required to compensate for misalignment, the structure can be used more efficiently than the prior art.

The gist of the present invention is a structure wherein a rotary detecting device is mounted on a X-Y stage. The specific structure of the X-Y stage can be varied and need not be limited to the article shown in said embodiments. Similarly, the joint and clamping units shown in the embodiments are meant to be illustrative rather than limiting. Each of these elements can be realized in many ways within the scope of known art and incorporated with the present invention without departing from its essential structure. It will thus be appreciated that the present invention is not restricted to the particular embodiments that have been described hereinbefore, and that variations and modifications may be made therein without departing from the spirit and scope of the invention as defined in the appended claims and equivalents thereof.

What is claimed is:

1. A structure for providing relative positioning of a rotary detecting shaft of a rotary detecting device and a rotary shaft mounted to a frame, comprising:
    a plate which can be fixed to the frame;
    a first sliding plate movably mounted to the plate fixed to the frame so as to be movable relative to the plate fixed to the frame back and forth along a line; and
    a second sliding plate movably mounted to the first sliding plate so as to be movable relative to the first sliding plate back and forth along a line at an angle to the first mentioned line of movement, the second sliding plate being fixable to the rotary detecting device.

2. A structure as in claim 1 wherein said angle between said first line and said second line is approximately 90°.

3. A structure for providing relative positioning of a rotary detecting shaft of a rotary detecting device and a rotary shaft mounted to a frame, comprising:
    a plate fixed to the frame;
    a first sliding plate movably mounted to the plate fixed to the frame so as to be movable relative to the plate fixed to the frame back and forth along a line; and
    a second sliding plate movably mounted to the first sliding plate so as to be movable relative to the first sliding plate back and forth along a line at an angle to the first mentioned line of movement, the second sliding plate being fixed to the rotary detecting device.

4. A structure as in claim 3 wherein said angle between said first line and said second line is approximately 90°.

* * * * *